United States Patent
Galbiati et al.

(12) 
(10) Patent No.: US 6,221,994 B1
(45) Date of Patent: Apr. 24, 2001

(54) TERMINATED SILANE MICHAEL POLYADDITION POLYMER

(75) Inventors: Paolo Galbiati; Alessandro Galbiati, both of Corso Cavour (IT)

(73) Assignee: Cheming, S.A. Luxembourg, Luxembourg (LU)

( * ) Notice: Subject to any disclaimer, the term of this patent is extended or adjusted under 35 U.S.C. 154(b) by 0 days.

(21) Appl. No.: 09/331,905

(22) PCT Filed: Dec. 22, 1997

(86) PCT No.: PCT/IB97/01588

§ 371 Date: Jun. 29, 1999

§ 102(e) Date: Jun. 29, 1999

(87) PCT Pub. No.: WO98/29462

PCT Pub. Date: Jul. 9, 1998

(30) Foreign Application Priority Data

Dec. 31, 1996 (IT) .............................................. RM96A0916

(51) Int. Cl.⁷ .................................................. C08G 75/02
(52) U.S. Cl. .............................. 528/26; 528/28; 556/413; 556/437
(58) Field of Search ........................ 528/26, 28; 556/413, 556/437

(56) References Cited

U.S. PATENT DOCUMENTS

| 3,829,529 | * | 8/1974 | Lengnick . | |
| 4,426,506 | * | 1/1984 | Blanco | 526/302 |
| 4,789,710 | * | 12/1988 | Furukawa et al. . | |
| 4,857,623 | * | 8/1989 | Emmerling | 528/28 |

FOREIGN PATENT DOCUMENTS

| 3719151 | * | 12/1987 | (DE) . |
| 4-89860 | * | 3/1997 | (JP) . |
| 09291135 | * | 11/1997 | (JP) . |

* cited by examiner

*Primary Examiner*—Robert Dawson
*Assistant Examiner*—Marc S. Zimmer
(74) *Attorney, Agent, or Firm*—Young & Thompson

(57) ABSTRACT

A terminated silane polymer is produced by reacting an organic derivative of silicon with the terminal groups of polymers that are obtained by a Michael polyaddition reaction of organic compounds that contain at least two active hydrogens to organic components that contain at least two ethylene bonds that are activated by the presence, in the alpha position with regard to each ethylene bond, of an electronegative group.

5 Claims, No Drawings

TERMINATED SILANE MICHAEL POLYADDITION POLYMER

This invention pertains to a new type of polymer, which is produced by reacting an appropriate organic derivative of silicon with the terminal groups of linear or branched polymers that are obtained from the reaction of Michael addition of organic compounds that contain at least two active hydrogens to organic compounds that contain at least two double ethylene bonds that are activated by the presence, in the alpha position with regard to each ethylene bond, of an electronegative group. The terminated silane polymer that is obtained, in the form of a viscous fluid that is stable under conditions of absence of moisture, for example, by simple exposure to air and without further additions of other substances at the time of use, quickly increases its viscosity until it turns into a solid product, which can be hard and tough like a resin or elastic and flexible like a rubber. These products can be used as coatings and sealers.

The reaction of Michael addition of monofunctional nucleophilic compounds to double bonds that are activated by electronegative groups in the alpha position with regard to the ethylene bond has been known for some time, and the polymers that are obtained by polyaddition of bifunctional nucleophilic molecules such as diols, diamines, and dithiols to activated diolefins such as diacrylic derivatives, dimethyacrylic derivatives (e.g., esters and amides), dinitroolefins, divinylsulfones, and divinylsulfoxides are known and described in the literature. Let us cite, in a list that is certainly not exhaustive: Bayer, O. *Angew. Chem.* 61, 229 (1949); Hulse, G. E. U.S. Pat. No. 2,759,913 (1956); Mallik, K. L., Das, M. N. Z. *Phys. Chem.* 25, 205 (1960); Nogudu, H., Rembaum, A. *J. Polym. Sci., Part B*, 7, 383 (1969); Danusso, F., Ferruti, P. *Polymer* 11, 88 (1970); Imai, Y. et al. *Makromol. Chem. Rapid Commun.* 1, 659 (1980); Imai, Y. et al. *J. Polym. Sci., Polym. Chem. Ed.* 19 583 (1981); Imai, Y. et al. *Polym. J.* 13 803 (1981); Mathias, L. J., Kress, A. O. *Polymer* 29, 302 (1988); Nuyken, O., Volkel, T. *Makromol. Chem.* 191, 2465 (1990); Ferruti, P., Ranucci, E. *Polym. J.* 23 541 (1991).

The polyaddition reaction proceeds readily at ambient temperature or at moderate temperature, producing polymers that are predominantly characterized by a structure of the anti-Markovnikov type when the reaction is catalyzed by a base or by a Markovnikov-type structure when the reaction is catalyzed by an acid, as in the case where dithiols are added to divinyl ethers.

The polyaddition reaction has the charactistics of a staged reaction. The mean numerical degree of polymerization $\overline{P_n}$ is given by:

$$\overline{P_n} = \frac{1+r}{1-2pr+r}$$

where:
r=the ratio between the quantity of compound in deficit and that of the compound in surplus;
p=degree of conversion of the compound in deficit.
When p=1, i.e., the conversion of the deficit product is quantitative, this becomes:

$$\overline{P_n} = \frac{1+r}{1-r}$$

and the mean degree of polymerization depends solely on the monomer ratio r.

When the monomers are made to react in an equimolar quantity, i.e., when the ratio between the quantities of the monomers is equal to one (r=1), the polymers that are obtained are products of extremely high (theoretically infinite) molecular weight with very little presence of free functional groups (theoretically none). In all the cases of equimolar reactions described in the literature, and in particular in U.S. Pat. No. 2, 759,913, very good agreement is observed between the elementary analysis of the polymers obtained and the theoretically calculated values. When the molecular ratio between the monomers is other than one (r≠1), the mean numerical degree of polymerization $\overline{P_n}$ is derived directly from the selected ratio, and the polymers that are obtained have terminal groups of the monomer in surplus. Examples of such polymers can be found in the literature cited: in all these cases very good agreement can be observed between the experimental data and the theoretically calculated mean molecular weights of the polymers obtained.

It can therefore be said that the reaction of polyaddition of organic compounds with at least two active hydrogens to compounds with at least two activated ethylene bonds in which process the molecular ratio between the monomers is other than one (r≠1) is a good way to obtain polymers and oligomers that have pre-established molecular weights and terminal groups. In addition, unlike reactions induced by radicals, there are no reticulation or chain-extension phenomena.

For the purposes of this invention, all of the polymers that are obtained with a ratio between the quantities of the monomers of other than one (r≠1) are usable since they are characterized by the presence of free functional groups that are required for subsequent silanization.

Polymers and oligomers from Michael polyaddition that are obtained with a ratio between the quantities of the monomers of other than one (r≠1) and terminate with functional groups such as amino, mercapto, activated ethylene, etc. do not have direct application in the area of coatings and sealers, but can be used only when mixed with other substances that have a functionality of greater than or equal to two and are able to react with the functional groups of the polymer or oliogmer. By way of example, let us mention the polyaddition polymers which terminate with a mercapto group and which can be reticulated by reacting with an epoxy resin, exploiting the reactivity of the nucleophilic mercapto group with regard to the oxyranic ring. The terminated mercapto polycondensation polymer acts as a chain extender of the epoxy resin and, if the chain is long enough, also of the flexibilizer of the resin itself. The reaction, which is catalyzed by a tertiary amine, takes place at as low as ambient temperature.

Other examples, which are well known to one skilled in the art, can be cited. Therefore these polymers find practical application only as parts of a bi-component system in which a product A, which has a well-defined weight or volume, must be accurately mixed with a product B, also having a well-defined weight or volume, and the A+B mixture must be used within a certain time, generally no more than one or two hours. It is also evident even to one not skilled in the art that the bi-component products have more than a few drawbacks with regard to their use: the metering of the products has to be very precise, the mixing has to be perfect, the time available for manipulation before it hardens is always limited, and it is impossible to recover the material in surplus.

There are, consequently, considerable advantages to using mono-component materials that do not have any of the drawbacks indicated above.

The object of this invention is to transform polyaddition polymers that are obtained by Michael addition, base-catalyzed, of organic compounds that have at least two active hydrogens to organic compounds that have at least two activated ethylene bonds, whereby the molecular ratio between the quantities of the monomers is other than one (r≠1), into polymers that reticulate completely and move from the fluid state to the solid state simply by being exposed to the humidity of the air and without further additions of other reactive substances, i.e., to transform them into mono-component products.

For this purpose since the polyaddition polymers are terminated with activated amine, mercaptane, or ethylene groups, these polymers are made to react with organic silicon derivatives which have either a reactive functional group that is suitable for reacting with the terminal functional group of the polyaddition polymer or suitable groups that can be easily hydrolyzed and condensed. The terminated silane polymers that are thus obtained are stable and retain their state as viscous fluids under anhydrous conditions but, if exposed to atmospheric humidity, are transformed into solid materials owing to the reticulation that is produced by the hydrolysis and subsequent addition of the groups to the terminal silicon atom. This mechanism is known and amply described in the literature.

Thus, for the purposes of this invention, usable polyaddition polymers are all those that can be obtained by Michael addition of monomers with a molecular ratio r of other than one (r≠1), whereby the choice of monomers will depend on the end use to which the polymer itself will be put, and their ratio will depend on the type of functional group and the molecular weight that are preselected.

In solventless systems the mean molecular weight of the polyaddition polymer should be between the minimum that can be obtained when the ratio between the quantity of monomer in deficit and that in surplus is equal to 0.5 and a maximum of approximately 20,000. Higher molecular weights would lead to viscosities that are too high for practical use. In the presence of a solvent, the molecular weight of 20,000 may be exceeded provided that the terminal functional groups are present in such numbers that, after reaction with the appropriate functional groups of the hydrolyzable silanes, a sufficiently high percentage of terminal silane groups and thus a structure with a degree of reticulation that is usable after vulcanization by exposure to humidity are obtained.

The Michael polyaddition polymers that are usable for this invention are characterized by the following two structures, which can be obtained with a different ratio between the monomers (diagrams 1 and 2):

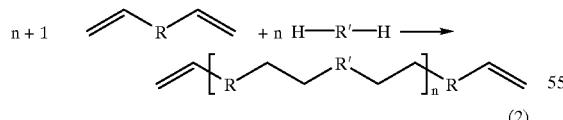

(1)

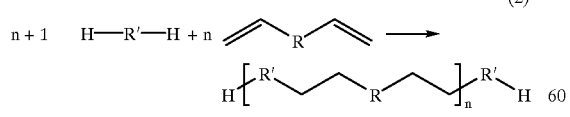

(2)

where:
H—R'—H= any organic compound that has at least two active hydrogens.
Examples of such compounds are:
HS(CH$_2$)$_n$SH, HS(Ph)SH, CH$_3$(CH$_2$)$_3$NH$_2$, H$_2$N(CH$_2$)$_n$NH$_2$, H$_2$N(Ph)NH$_2$, CH$_3$HN(CH$_2$)$_n$NHCH$_3$, HN(CH$_2$CH$_2$)$_2$NH, H$_2$C(COOH)$_2$. and:
H$_2$S(CH$_2$)$_n$SH, HS(Ph)SH, CH$_3$(CH$_2$)$_3$NH$_2$, H$_2$N(CH$_2$)$_n$NH$_2$, H$_2$N(Ph)NH$_2$, CH$_3$HN(CH$_2$)$_n$NHCH$_3$, HN(CH$_2$CH$_2$)$_2$NH, H$_2$C(COOH)$_2$.

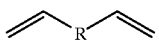

=any organic compound that has at least two activated double bonds.

Examples of such compounds are:

H$_2$C=CHCOO(CH$_2$CH$_2$O)$_n$COCH=CH$_2$,

H$_2$C=C(CH$_3$)COO(CH$_2$CH$_2$O)$_n$COC(CH$_3$)=CH$_2$,

H$_2$C=CH—SO$_2$—CH=CH$_2$, H$_2$C=CH—SO—CH=CH$_2$,

H$_2$C=CH—O—CH=CH$_2$.

The organic silicon compounds that are usable for this invention have the following structure:

(3)

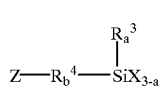

with: a=0,1,2; b=0,1
where:

X=group selected from a class that includes halogen, alkoxy, acyloxy, ketoxime, amine, amide, and mercaptan radicals R$^3$=monovalent hydrocarbon group;

R$^4$=bivalent group that has a bonding function and can be selected from a hydrocarbon radical, an ether-hydrocarbon radical, or an amino-hydrocarbon radical;

Z=member selected from the following group:

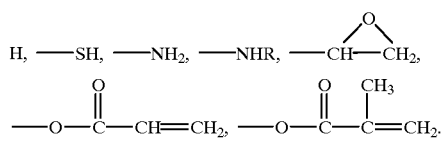

Examples of products of this kind are:
dichloromethylsilane (4);
mercaptopropyltrimethoxysilane (5);
aminopropyltrimethoxysilane (6);
glycidoxypropyltrimethoxysilane (7).

(4)

(5)

-continued

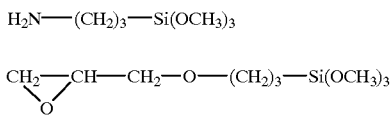

(6)

(7)

The terminated silane polymers which are obtained by reacting polyaddition polymers (1) and (2) as described above with an organic silicon compound (3) as described above and which are the subject of this invention are characterized by the following terminal structures:

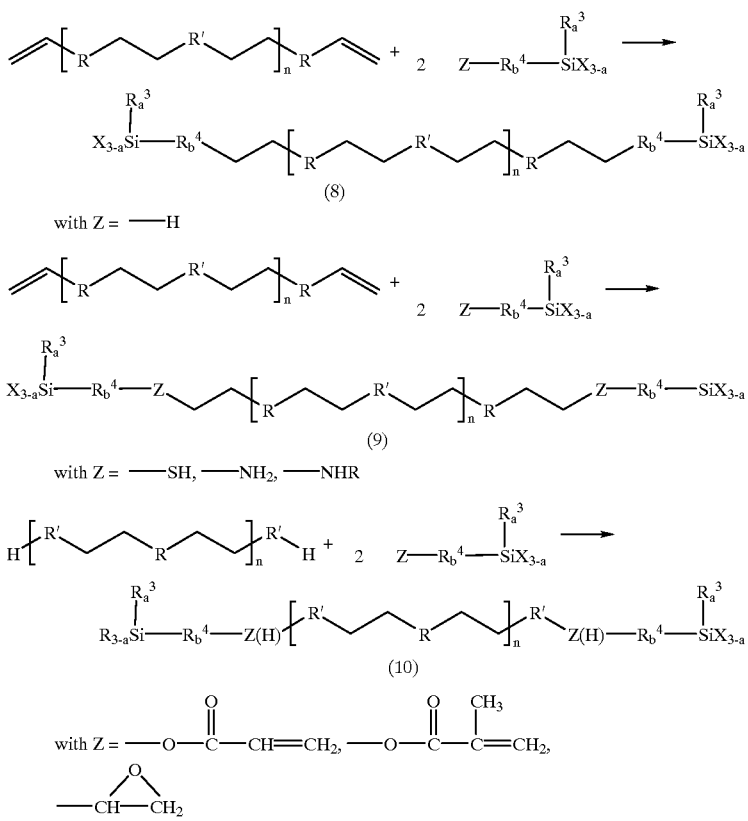

(8)

with Z = —H (9)

with Z = —SH, —NH$_2$, —NHR (10)

with Z = and where R, R', $R^4_b$, $R^3_a$, $X_{3-a}$ (with a=0,1,2 and b=0,1) are those that correspond to structures (1), (2), and (3).

The polymers that are preferred for this invention are those that are derived from the polyaddition of dithiols to diacrylates or dimethacrylates; this does not rule out the use of other monomers, e.g., aliphatic diamines and bis-acrylamides.

The molar ratio between the monomers may be any value, with the exception of a ratio equal to one, i.e., with the exception of polymers that are obtained from equimolar quantities of monomers, and is calculated as a function of the type of terminal functional group and the mean molecular weight that are preselected.

The bis-thiolo that is preferred for this invention is:

HS—R'—SH          (11)

where R' is preferably a divalent alkyl radical that has from 2 to 12 carbon atoms, an aryl radical, or any other divalent radical.

Example: HS—CH$_2$—CH$_2$—SH 1,2-ethanedithiol.

The diacrylates or dinethylacrylates are:

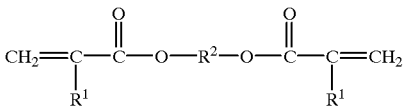

(12)

where:

$R^1$=—H, —CH$_3$.

$R^2$ is preferably a polyether that consists essentially of units of the chemically combined —OR$^3$— type, where $R^3$ is a divalent alkyl group that has from 2 to 4 carbon atoms or any other divalent radical.

The molecular weights of the combined —OR$^3$— units vary from 50 to 15,000. An example of a product that belongs to this class of compounds is:

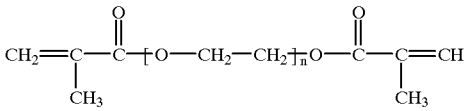

Poly(ethyleneglycol)dimethacrylate, where n can vary between 1 and 400, preferably from 1 to 50.

The polyaddition polymers which are suitable for silanation and are obtained by reacting a dithiol of the type described above (11) with a dimethacrylate or diacrylate as described above (12) will have one of the following structures, depending on the molecular ratio that is selected among the monomers (diagrams 13 and 14):

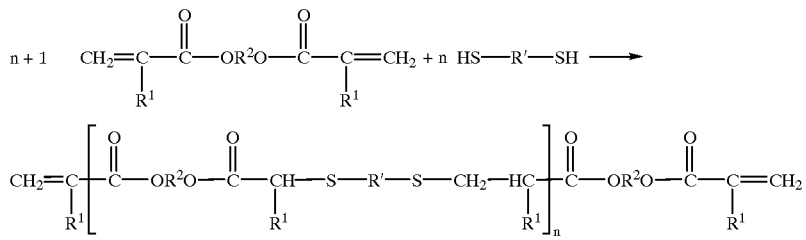

(13)

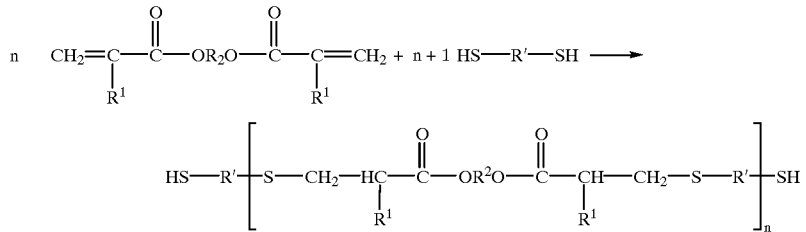

(14)

with $R^1$, $R^2$, $R'$ as described above.

For example, polymers that are obtained from ethyleneglycol dimethacrylate and 1,2-ethanediol:

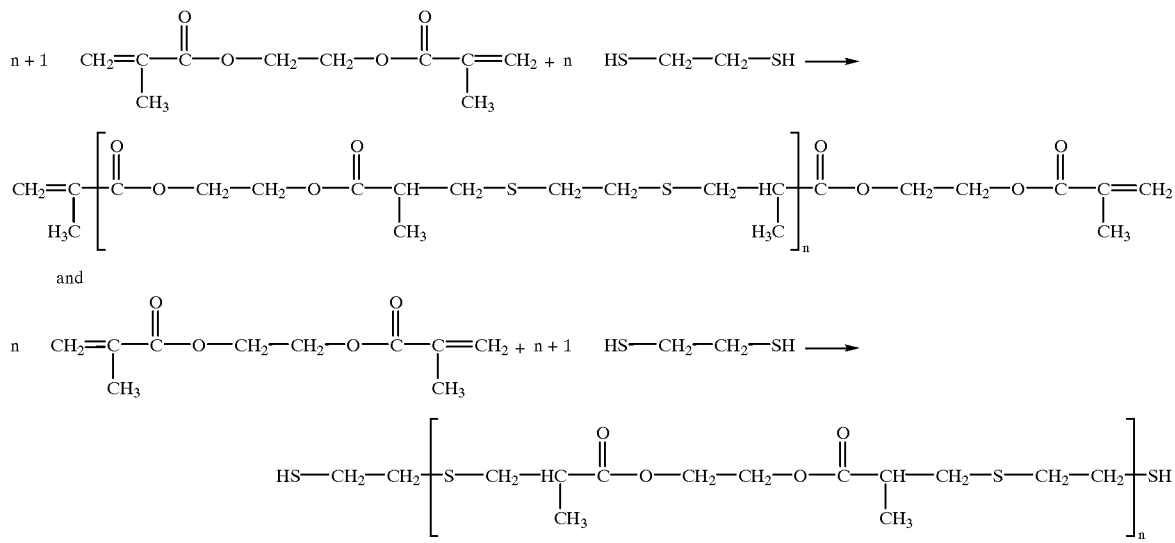

The organic compounds of silicon that are preferred for this invention are:

HS—$R^4$—Si(OCH$_3$)$_3$ mercaptoalkyltrimethoxy silanes  (15)

CH$_2$=C($R^5$)—COO—$R^4$—Si(OCH$_3$)$_3$  (16)

alkylmethacrylatetrimethoxy silanes where:

$R^4$=divalent alkyl radical that contains from 1 to 8 carbon atoms $R^5$=—H, —CH$_3$;

Examples

HSCH$_2$CH$_2$CH$_2$Si(OCH$_3$)$_3$ 3-mercaptopropyltrimethoxy silane CH$_2$=C(CH$_3$)COOCH$_2$CH$_2$CH$_2$Si(OCH$_3$)$_3$ 3-methacrylopropyltrimethoxy silane The silane polymers that are the subject of this invention and are obtained by reacting polyaddition polymers (13) and (14) with silanes (15) and (16) may be depicted in diagrammatic form as follows:

(17)

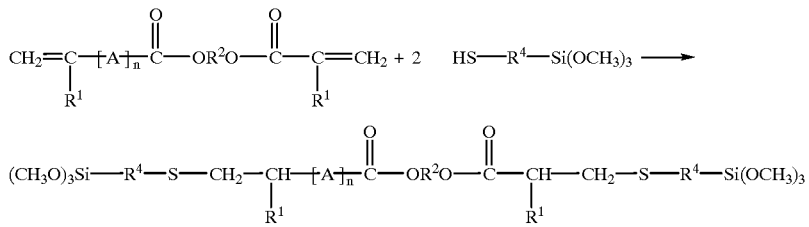

where:
A=repeating unit of the structure of diagram (13), and $R^1$, $R^2$, and $R^4$ are as described above.

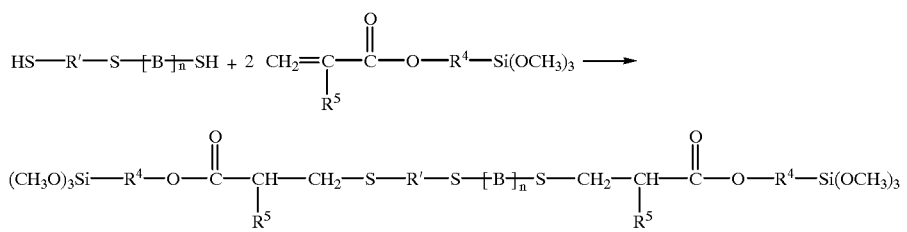

where:
B=repeating unit of the structure of diagram (14), and $R'$, $R^4$, and $R^5$ are as described above.

Since the rate of the hydrolysis reaction of the alkoxy silane groups and of the condensation of the silanols that leads to the vulcanization of terminated silane addition polymers is moderate, it is generally preferable to use a catalyst. Any known catalyst that ensures the hydrolysis and condensation of silanols can be used. Examples of such compounds are the metal salts of carboxylic acids such as dibutylstannodilaurate, stannous octoate, etc, the organic derivatives of titanium such as alkytitanates, etc., and any other acidic or basic catalyst. The catalyst quantitative can vary from 0.1 to 10 parts by weight per 100 parts by weight of polymer, but larger or smaller quantitatives may also be used, depending on need.

The polymers of this invention can also be modified with the fillers normally used in polymers. Let us cite, by way of example, reinforcing fillers such as pyrogenic silica, precipitated silica, and carbon black, or non-reinforcing fillers such as, e.g., precipitated or ground calcium carbonate, magnesium carbonate, kaolin, talc, zinc iron titanium oxides, and organic and inorganic fibrous materials. All of the fillers which are used in the rubber industry and of which those mentioned above are only a few may be used by themselves or in a mixture, whereby each imparts a particular characteristic to the polymer. The choice among the various fillers can be made keeping in mind the mechanical characteristics (elongation, ultimate strength, hardness, resistance, etc.) that are required for the end product, without neglecting the Theological characteristics of the product before vulcanization (viscosity, density, flow, thixotropy, etc.).

Together with mineral fillers, terminated silane polyaddition polymers can also be modified With plasticizers, which are generally used to modify the Theological and mechanical properties of the end product. The basic requirement imposed on a plasticizer is that it be compatible with the polymer: plasticizers that are only partly compatible are expelled within a period of time that varies depending on the degree of compatibility, giving rise to separation phenomena before vulcanization and exudation phenomena after vulcanization. Any plasticizer that is known in the art is suitable. Let us cite, by way of example, the esters of phthalic acid, the esters of adipic acid, phosphoric esters, epoxidated soy oils, chlorinated paraffins, etc.

In addition to fillers and plasticizers, it is also possible to use other additives in a mixture with the polymers of this invention: pigments, antioxidants, UV stabilizers, additives to improve adhesion (e.g., epoxide resins or phenolic resins), etc. Since terminated silane polymers are sensitive to humidity, the fillers and, in general, all products that are added must be dehyrated before use.

A few examples of silane terminated polyaddition polymers according to the present invention are listed below, and, for each one, a brief explanation is given relating to the proces used for their preparation.

EXAMPLE 1

A silane terminated polyaddition polymer is prepared by mixing thoroughly 77.56 g (0.14 moles) of a polyoxyethylendimethacrylate, 14.07 g (0.13 moles) of 1,3-propanedithiol, 1.8 g (0.018 moles) of triethylamine as the catalyst, in a reaction vessel in the presence of a very small quantity of a defoaming agent.

Because of the reaction of the mercapto and double bond groups, the temperature of the mixture rises very quickly to as high as 95° C., stays at the maximum temperature for a short time then decreases slowly. In order for all the reactive groups to react the temperature must be maintained at 75° C. until the mercapto groups can no longer be detected by an analysis carried out with the usual analytical methods. The process requires a long time, about 24 hours. Thereafter 3.9 g (0.02 moles) of mercaptopropyltrimethoxysilane are added to the mixture maintained at 75° C. and thoroughly mixed, again the process is continued until the double bond groups can no longer be detected by the usual analytical methods.

The polymer is then poured into a metal container, degassed, flushed with nitrogen and stored for further compounding.

The $^1$-H-NMR analysis of the polyaddition polymer confirms the expected linear structure and the lack of secondary reactions.

The quantitative analysis of the terminal double bond groups confirms the expected mean numerical molecular weight (Mn) of 9.100 in accordance with the ratio of the reactant monomers.

The $^1$-H-NMR analysis of the silanated polyaddition polymer confirms the quantitative addition of the mercapto groups of the silane molecule to the terminal double bond groups of the polyaddition polymer.

The final product therefore is a polyaddition polymer with silane terminal groups and a calculated mean numerical molecular weight (Mn) of 9.500. The viscosity of the silane terminated polymer is 29.000 mPa·s.

A sample of the polymer mixed with a tertiary amine (1% in weight) acting as the hydrolysis and condensation catalyst of the methoxy groups, shows no changes when stored in a dry nitrogen atmosphere, but when it is exposed to atmospheric air, it changes quickly and forms a tack-free rubber-like skin in less that 30 minutes.

EXAMPLE 2

A silane terminated polyaddition polymer is prepared by mixing thoroughly 77.56 g (0.14 moles) of polyoxyethylendimethacrylate, 12.25 g (0.13 moles) of 1,2-ethandithiol and 1.7 g (0.017 moles) of triethylamine as the catalyst, in a reaction vessel in the presence of a very small quantity of a defoaming agent.

Thereafter 3.9 g (0.02 moles) of mercaptopropyltrimethoxysilane are added to the mixture.

The reaction procedure (time, temperature and analysis methods) is the same as previously illustrated in example 1.

The $^1$-H-NMR analysis of the polymer confirms a linear structure and a mean numerical molecular weight (Mn) of 9.200.

The viscosity of the polymer at 23° C. is 27.000 mPa·s.

A sample of the polymer mixed with a tertiary amine (1% in weight) acting as the hydrolysis and condensation catalyst of methoxy groups, shows no changes when stored in a dry nitrogen atmosphere, but when it is exposed to atmospheric air it changes quickly and forms a tack-free rubber-like in less than 30 minutes.

EXAMPLE 3

A silane terminated polyaddition polymer is prepared by mixing thoroughly 77.56 g (0.14 moles) of polyoxyethylendimethacrylate, 16.25 g (0.15 moles) of 1,3-propanedithiol and 1.74 g (0.017 moles) of triethylamine as the catalyst, in a reaction vessel in the presence of a very small quantity of a defoaming agent.

The temperature is maintained at 75° C. and the reaction is continued until the double bond groups can no longer be detected by the usual analytical methods.

Thereafter 4.99 g (0.02 moles of gammamethacryloxypropyltrimethoxysilane are added and the temperature (75° C.) and mixing are maintained until the mercapto groups can no longer be detected by the usual analytical methods. The polymer is then poured into metal container, degassed, flushed with nitrogen and stored for further compounding.

The $^1$-H-NMR analysis of the polymer confirms a linear structure and a mean numerical molecular weight (Mn) of 9.900.

The viscosity of the polymer at 23° C. is 29.000 mPa·s.

A sample of the polymer mixed with a tertiary amine (1% in weight) acting as the hydrolysis and condensation catalyst of the methoxy group, shows no changes when stored is a dry nitrogen athmosphere, but when it is exposed to atmospheric air it changes quickly and forms a tack-free rubber-like skin in less than 30 minutes.

EXAMPLE 4

A silane terminated polyaddition polymer is prepared by mixing thoroughly 22.16 g (0.04 moles) of polyoxyethylendimethacrylate, 3.24 g (0.03 moles) of 1,3-propanedithiol and 0.5 g (0.005 moles) of triethlyamine as the catalyst, in a reaction vessel.

The temperature, as in example 1, is maintained at 75° C. until the mercapto groups can no longer be detected by the usual analysis methods.

Thereafter 3.9 g (0.02 moles) of mercaptopropyltrimethoxysilane is added, the temperature (75° C.) and mixing are maintained until the double bond groups can no longer be detected by the usual analysis methods.

The $^1$-H-NMR analysis of the polymer confirms a linear structure and a mean numerical molecular weight (Mn) of 2.900.

The viscosity of the polymer at 20° C. is 2.900 mPa·s

A sample of the polymer mixed with a tertiary amine (1% in weight) acting as the hydrolysis and condensation catalyst of the methoxy group, shows no changes when stored is a dry nitrogen atmosphere, but when it is exposed to atmospheric air it changes quickly and forms a tack-free, hard and flexible skin in less than 30 minutes.

EXAMPLE 5

100 parts in weight of polymer of the example n. 1 are mixed with 100 parts of calcium carbonate, 10 parts of titanium dioxide, 0.5 parts of an antioxidant and 1.0 part of a tertiary amine catalyst.

The mixing is carried out in a planetary mixing machine in a dry nitrogen atmosphere. The compound, in the form of a soft and tixotropic paste is degassed and stored in metal cartridges. No change occurs as long as the compound is kept into the metal cartridges, but when, it is exposed to atmospheric air, it forms a tack-free elastic skin in less than 30 minutes and cures entirely in 24 hours.

The cured elastic compound shows the following properties:

Hardness Shore A=25, elongation to rupture>200% and 100% modulus 0.4 MPa.

What is claimed is:

1. Terminated silane polymer, characterized by the fact that it is obtained by an addition reaction between an organic derivative of silicon and the terminal groups of polymers that are obtained by a Michael polyaddition reaction of organic compounds that contain at least two active hydrogens to organic components that contain at least two ethylene bonds that are activated by the presence, in the alpha position with regard to each ethylene bond, of an electronegative group.

2. Terminated silane polymer according to claim 1, characterized by the fact that it is derived from the Michael polyaddition of a dithiol to a diacrylate.

3. Terminated silane polymer according to claim 1, characterized by the fact that it is derived from the Michael polyaddition of a dithiol to a dimethacrylate.

4. Terminated silane polymer according to claim 1, characterized by the fact that it is derived from the Michael polyaddition of a diamine to a diacrylate.

5. Terminated silane polymer according to claim 1, characterized by the fact that it is derived from the Michael polyaddition of a diamine to a dimethacrylate.

* * * * *